United States Patent
Laubstein

(10) Patent No.: US 9,400,208 B2
(45) Date of Patent: Jul. 26, 2016

(54) LOAD CELL AND METHOD FOR ADJUSTING A LOAD CELL

(71) Applicant: SARTORIUS LAB INSTRUMENTS GMBH & CO. KG, Goettingen (DE)

(72) Inventor: Michael Laubstein, Goettingen (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 397 days.

(21) Appl. No.: 13/961,958

(22) Filed: Aug. 8, 2013

(65) Prior Publication Data

US 2013/0319072 A1    Dec. 5, 2013

Related U.S. Application Data

(63) Continuation of application No. PCT/EP2012/000271, filed on Jan. 21, 2012.

(30) Foreign Application Priority Data

Feb. 8, 2011    (DE) .......................... 10 2011 000 554

(51) Int. Cl.
    *G01G 23/01*    (2006.01)
(52) U.S. Cl.
    CPC .............. *G01G 23/012* (2013.01); *G01G 23/01* (2013.01)
(58) Field of Classification Search
    CPC .............................. G01G 23/01; G01G 23/012
    See application file for complete search history.

(56) References Cited

U.S. PATENT DOCUMENTS

| 4,766,965 A | 8/1988 | Luchinger |
| 6,194,672 B1 | 2/2001 | Burkhard et al. |
| 6,637,265 B1 * | 10/2003 | Hay, Jr. .................. G01G 5/00 73/433 |
| 2003/0188897 A1 * | 10/2003 | Ludi ....................... G01G 21/28 177/145 |
| 2005/0023047 A1 * | 2/2005 | Yoshikuwa ............ G01G 23/012 177/229 |
| 2008/0242970 A1 * | 10/2008 | Minagawa ............. A61B 5/4504 600/407 |
| 2013/0319072 A1 | 12/2013 | Laubstein |

FOREIGN PATENT DOCUMENTS

| DE | 8324676.2 U1 | 9/1984 |
| DE | 8715016.6 U1 | 4/1988 |
| DE | 20304062 U1 | 3/2004 |
| EP | 0955530 A1 | 11/1999 |
| JP | 61-082118 | 4/1986 |
| JP | 9-043043 | 2/1997 |
| WO | 2012107166 A1 | 8/2012 |

OTHER PUBLICATIONS

International Search Report in counterpart International Application No. PCT/EP2012/000271, mailed Mar. 5, 2012.

* cited by examiner

*Primary Examiner* — Hezron E Williams
*Assistant Examiner* — David Z Huang
(74) *Attorney, Agent, or Firm* — Edell, Shapiro & Finnan, LLC

(57) ABSTRACT

A load cell (10), which includes a weighing system (14) having a force application point (18), a load boom arm (20) for receiving the loads to be weighed at a position remote from the force application point (18) and an adjusting device, wherein an adjusting weight boom arm (28) is provided which extends in a longitudinal direction (A) defined by the load boom arm on the side opposing the load boom arm (20) relative to the force application point (18) and which has at least two pre-determined adjusting weight engagement points (36, 38). An activating unit (34) places at least one adjusting weight (30, 32) on at least one of the adjusting weight engagement points (36, 38).

12 Claims, 2 Drawing Sheets

LOAD CELL AND METHOD FOR ADJUSTING A LOAD CELL

The present application is a Bypass Continuation of International Application No. PCT/2012/000271, filed on Jan. 21, 2012, which claims priority from German Patent Application No. 10 2011 000 554.4, filed on Feb. 8, 2011. The contents of these applications are hereby incorporated into the present application by reference in their respective entireties.

FIELD AND BACKGROUND OF THE INVENTION

The invention relates to a load cell with a weighing system having a force application point, a load boom arm for receiving the loads to be weighed at a position remote from the force application point and an adjusting device, wherein the load boom arm extends, in plan view, from the force application point to the load cell in a longitudinal direction.

The load cell is effectively the core of an electromechanical scale. Normally, a parallelogram which must transfer the load to a weighing boom, also referred to as a gearing lever, is accommodated in the load cell. Using well known methods of electromagnetic force compensation, the force acting on the weighing boom is measured. In the load cell, the force is conducted to a pre-determined force application point. When a load boom arm is used, the load to be weighed does not lie externally above the force application point of the load cell, but instead remote therefrom. It is not possible to transfer the weight force of the load to the weighing boom without errors since with the loading remote from the force application point, also referred to below as off-centeredness, off-center load errors arise. When a scale is produced, the off-center load error, which depends linearly on the moment created by the load and the off-centeredness, is reduced to a minimum by adjustment, although small errors still remain. The off-center load error can change due to temperature changes and stresses, in particular during transport.

Apart from the off-center load error, which is caused by the load boom arm, there is also a second off-center load error which arises because the weight is not precisely placed in the center point or the central axis of the pan, but rather is off-center in relation to the central axis. However, the present invention does not concern this second off-center load error.

The off-center load errors also take effect on loading of the scale with internal adjusting weights insofar as these weights exert a moment on the load cell. In the known scales, efforts have therefore always been made to arrange the internal adjusting weights in the same vertical axis as the load to be weighed (that is, in the axis of the resultant force defined by the load to be weighed), since in this way, adjustment errors with changing off-center load are minimized. The result of this is that, as a rule, structural space for the internal adjusting weights is required in the direct proximity of the load to be weighed. However, this disadvantageously limits the design possibilities in the vicinity of the load engagement point (for example, a scale pan at a load boom arm).

DE 203 04 062 U1 discloses a load cell in the form of a top-pan system. The force application point in the load cell lies on the axis of the pan and the load cell is positioned directly beneath the pan. The adjusting weight is also arranged beneath the pan. Arranged around the adjusting weight is a temperature-compensating mass which is intended to prevent uneven temperature conditions beneath the pan.

DE 83 24 676 U1 discloses a top-pan analytical scale which is provided with an L-shaped support arm on which the scale pan is placed. Adjusting weights are arranged directly beneath the scale pan, close to the central axis of the scale pan, in order to be placed on the boom of the support arm.

OBJECTS AND SUMMARY OF THE INVENTION

It is an object of the invention to provide a load cell in which the goods to be weighed can be very easily placed on the load boom arm and which has an effective adjusting device for compensating for off-center load error.

According to one formulation, this object is achieved with a load cell of the aforementioned type which has an adjusting weight boom arm which extends in the longitudinal direction on the side opposing the load boom arm relative to the force application point and which has at least two pre-determined adjusting weight engagement points provided thereon. Furthermore, at least one activation unit is provided which places at least one adjusting weight onto the adjusting weight engagement points. In plan view, that is, a vertical view onto the load cell, the load boom arm and the adjusting weight boom arm extend in opposing manner in the longitudinal direction which passes through the force application point. In known load cells, the adjusting weight boom arms are normally arranged, in a lateral view, under the load boom arms or the load boom arms and adjusting weight boom arms form one unit. However, in the load cell according to the invention, the adjusting weight boom arm is arranged as an extension of the load boom arm such that the load boom arm is able to project downwardly to a maximum extent. It is therefore possible, in the case of bench scales, to bring the load boom arm as close as possible to the bench surface and not to utilize any structural space beneath the load boom arm, and thus beneath the bench surface, for the adjusting weights. The resulting compact design of the device makes it substantially more comfortable for the user to place the goods to be weighed on the load boom arm, and improves both the operational speed and the operational accuracy during metering of substances. The invention provides for arranging the adjusting weight boom arm on the opposing side of the force application point relative to the pan. With this arrangement of at least one adjusting weight on the opposing side, an off-center load error brought about on the pan side by the load boom arm can be compensated for. At least one adjusting weight is placed, remote from the force application point. Through the placement of the second adjusting weight, for example, with moment-free placement, the off-center load error on the pan side can be determined, so that this error can be eliminated by calculation. This is also possible if both adjusting weights are placed off-center, since the determination of the off-center load error is carried out using the difference between the different compensations by using of the two differently acting adjusting weights. The activating unit, which places the adjusting weights or the adjusting weight, functions under motor power and is usually also designated the calibration weight application unit.

It is possible, by using of the two adjusting weight engagement points on the adjusting weight boom arm, to determine the off-center load automatically at any time. This determination of the off-center load can be carried out both during factory calibration of the internal adjusting weights as well as during an internal adjustment of the scale by the user. In this way, it is possible to take into consideration a possible change in the off-center load error during calculation of the adjustment factor.

The load boom arm typically extends into a weighing chamber adjoining the load cell. The adjusting weight boom arm is arranged outside this weighing chamber, laterally remote therefrom or, more precisely expressed, extends in a longitudinal direction, relative to the force application point, in the opposing direction of the load boom arm and away therefrom.

The adjusting weight boom arm should preferably be located in the interior of the housing of the load cell and therefore protected from external influences.

Two, or at least two, weighing steps are performed, specifically at the at least two pre-determined adjusting weight engagement points. It is herein possible to place the same adjusting weight at both points or to provide a separate adjusting weight at each adjusting weight engagement point. The activating unit places the two adjusting weights one after the other onto the adjusting weight boom arm or positions the same adjusting weight so as to place this weight once at the first engagement point and once at the second engagement point.

According to one advantageous embodiment, it is provided that one of the two adjusting weight engagement points is substantially moment-free in relation to the weighing system. This means that this adjusting weight engagement point is situated with the force application point in a vertical axis. The other adjusting weight engagement point is arranged remote from the force application point in order to deliberately create an off-center load. Another embodiment of the invention provides that the two adjusting weight engagement points are arranged at different distances from the force application point so that an off-center load is created at both the force application points.

Where the adjusting weights are provided, both adjusting weights have substantially the same mass, wherein in relation to the measurement accuracy of the load cell, "substantially" indicates the same mass.

The weighing system is the electromechanical unit in the load cell into which the force is conducted during weighing or adjusting and in which the deflection of the mechanical part is detected electrically due to the load applied. The load boom arm and the adjusting weight boom arm can advantageously be coupled to the weighing system at the same point. The load boom arm and the adjusting weight boom arm can merge into one another, that is, either integrally or with contacting of the two arms.

Preferably both the adjusting weight boom arm and the load boom arm are elongated and linear bodies in plan view, so that the adjusting weight boom arm is a linear extension of the load boom arm reaching beyond the force application point.

Within the housing of the load cell, the load boom arm and the adjusting weight boom arm should extend at the same height and/or vertically offset in the longitudinal direction, but coupled into the weighing system together at the force application point.

In one embodiment of the invention, a further adjusting weight boom arm is provided for the application of an adjusting weight, said boom arm extending transversely to the line connecting the load application point at the load boom arm and the force application point, that is, transversely to the longitudinal direction. In this case, the second adjusting weight boom arm also creates an off-center load during loading, so that together with the off-center load from the first boom arm, the off-center load error of the load cell can also be determined in the orthogonal direction. The off-center load error is therefore compensated for in the forward/rearward direction by the adjusting weight boom arm extending in the longitudinal direction, whereas the second adjusting weight boom arm extending transversely to the longitudinal direction is provided for determining and possibly for compensating for the off-center load error to right and left.

Inadmissible changes to the off-center load error can be used, for example, for recognizing damage to the load cell.

The invention also relates to a method for adjusting a load cell of the aforementioned type. The method includes:

placing at least one adjusting weight on the adjusting weight engagement point at the adjusting weight boom arm, determining the weight values at both the adjusting weight engagement points, calculating the change in the off-center load between the factory adjustment and the momentary state, and determining the calibration factor of the scale, taking into account the off-center load error or the change therein.

The relevant calculation methods are sufficiently well known to persons skilled in the art and therefore do not need to be described in detail.

It is advantageous if a limit value for the off-center load is stored in the load cell or, more generally, in the control system of the load cell during manufacturing. Once the limit value of the determined off-center load error has been reached, if the load cell is used, an error message is output in order to notify the incorrect state of the device. If the scale includes a suitable processor for digitally compensating the off-center load error, it is possible to compensate therefor automatically. If such compensation is not possible, measures must be instigated for mechanically correcting the error, possibly by service personnel.

According to another advantageous embodiment, the change in the off-center load is calculated from the deviation of the difference of the two adjusting weights from the state during calibration at the time of manufacturing.

BRIEF DESCRIPTION OF THE DRAWINGS

Further features and advantages of the invention are disclosed in the following description and the accompanying drawings to which reference is made, and in which.

DETAILED DESCRIPTION OF EXEMPLARY EMBODIMENTS

Figure 1:
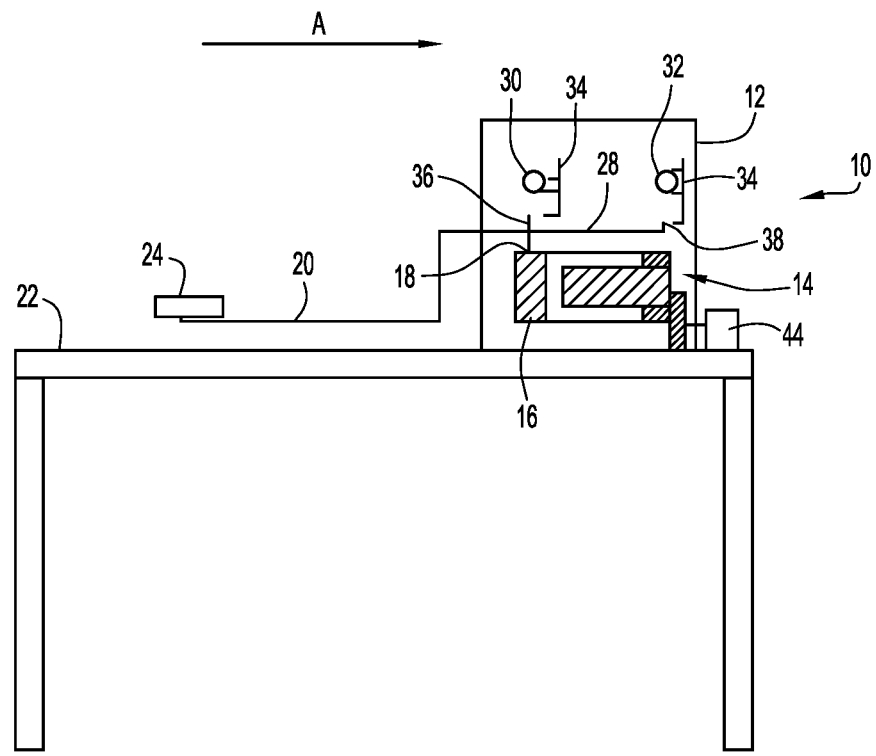
FIG. 1 is a schematic side view of an inventive load cell with two adjusting weights.

FIG. 1 shows a load cell 10 with a housing 12. Situated in the interior of the housing 12 is a weighing system 14, which preferably comprises a parallelogram 16 configured to transfer the load applied to a weighing boom 17 (see FIG. 3).

Provided at one end of the parallelogram 16 is a force application point 18 at which a load boom arm 20 which projects out of the housing is coupled to the weighing system.

The load boom arm 20 preferably extends horizontally within the housing 12 and is then angled downwardly outside the housing 12 so that the downwardly angled section extends very close to and along a table surface 22.

The distance between the downwardly angled section of the load boom arm 20 and the table surface 22 is minimal.

Fastened to the end of the load boom arm 20 is a pan 24 which is able to accommodate the goods to be weighed.

The load boom arm 20 is releasably fastened via, for example, a coupling (not shown).

Seen in plan view (FIG. 3), the load boom arm 20 is an elongated, linear structure which extends in a longitudinal direction A, also called the longitudinal axis, to the force application point 18.

From the force application point 18, an adjusting weight boom arm 28 also extends in the longitudinal direction A, but on the side opposing the load boom arm 20 relative to the force application point 18.

In the embodiment shown, the load boom arm 20 and the adjusting weight boom arm 28 are preferably coupled to the weighing system 14 at the same point and merge into one another at the force application point 18.

The adjusting weight boom arm 28, in the exemplary, non-limiting embodiment shown, consists in effect of a linear extension of the load boom arm 20.

Using the adjusting weight boom arm 28, the front/rear off-center load error (off-center load error in the longitudinal direction A) is determined, in order to compensate therefor or at least largely to compensate therefor.

As shown in FIG. 1, within the housing 12, the load boom arm 20 and the adjusting weight boom arm 28 extend at the same height and horizontally.

The adjusting weight boom arm 28 is part of an adjusting device which has, apart from the adjusting weight boom arm 28, two or more adjusting weights 30, 32, with which the load cell 10 is adjusted at the installation site.

The two adjusting weights 30, 32 can be arranged at different distances from the force application point 18 and, in the embodiment shown, the adjusting weight 30 is arranged exactly above the force application point 18.

One or both of the weights can be duplicated in order to enable linearization of the scale.

In the exemplary embodiment shown, the adjusting weight 32 are provided at an end of the adjusting weight boom arm 28 opposing the force application point 18.

The adjusting device also comprises activating units 34, with each of which an adjusting weight 30, 32 is associated, which enable placement of the respective adjusting weight 30, 32 on the adjusting weight boom arm 28.

With the activating units 34, the adjusting weights 30, 32 are placed, one after the other, on the adjusting weight engagement points 36 or 38 on the adjusting weight boom arm 28.

The adjusting weights 30, 32 can have the same or mutually differing weight.

The method for adjusting the load cell 10 with which the load cell operates provides the following: during manufacturing, the load cell 10 is adjusted, i.e. the calibration factor is determined. This is achieved with one or more weights which are placed on the pan 24. Subsequently, the weight values of the two adjusting weights 30, 32 are determined at their associated adjusting weight engagement points 36, 38 using the load cell 10, and the weight difference between the two weights 30, 32 is also determined.

Thus, during a later adjustment operation of the scale, it is possible to determine, from the change in the determined weight difference between the two adjusting weights determined during manufacturing, a change in the off-center load, which is then taken into account by the computer when the calibration factor is determined.

Stored in the control system 44 is a limit value for the difference as determined from the state during manufacturing. If, during later adjustment of the load cell 10 on location, this limit value is exceeded, this indicates a defect in the load cell 10 and an error message is output on a display.

It is not essential for two adjusting weights 30, 32 to be provided. As an alternative thereto, one adjusting weight 30, which is laid successively at the two adjusting weight engagement points 36, 3,8 can also be provided, as shown in FIG. 2.

In this case, the activating unit 34 is also provided not only with vertically adjustable motors or levers, but also with a horizontal adjusting device which moves the adjusting weight 30 between the adjusting weight engagement points 36, 38.

Figure 2:
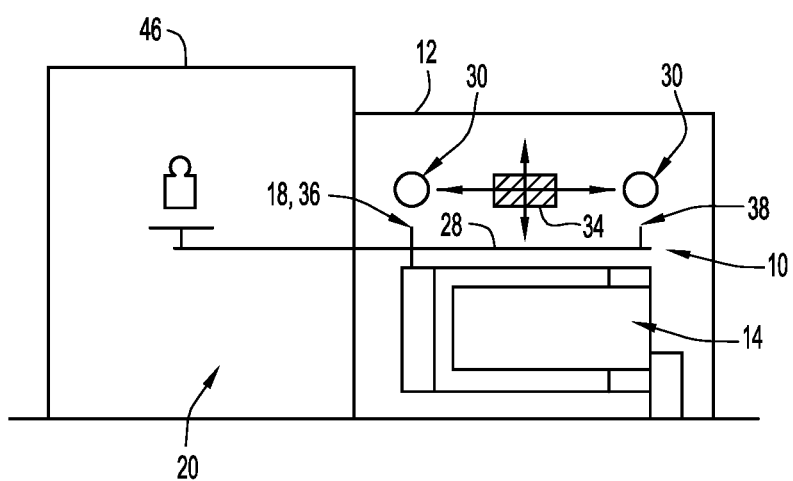
FIG. 2 is a schematic side view of another embodiment of the inventive load cell with a weighing chamber and only one adjusting weight.

In the embodiment of FIG. 2, a weighing chamber 46 is also shown, into which the load boom arm 20 projects. The weighing chamber 46 is defined by a windshield. A weighing chamber 46 of this type can also be provided in the embodiment of FIG. 1, wherein, in this case also, the weighing chamber adjoins the housing 12.

In the embodiment according to FIG. 2, it is also shown that the load boom arm 20 is not angled downwardly, even though this would also be advantageous and possible in this embodiment. This is possible because the adjusting weight boom arm 28 does not extend in the weighing chamber 46 or thereunder, but rather in the longitudinal direction defined by the load boom arm 20 at the side opposing the load boom arm 20 relative to the force application point 18 and thereby effectively forms, in particular, a linear extension of the load boom arm 20.

Figure 3:
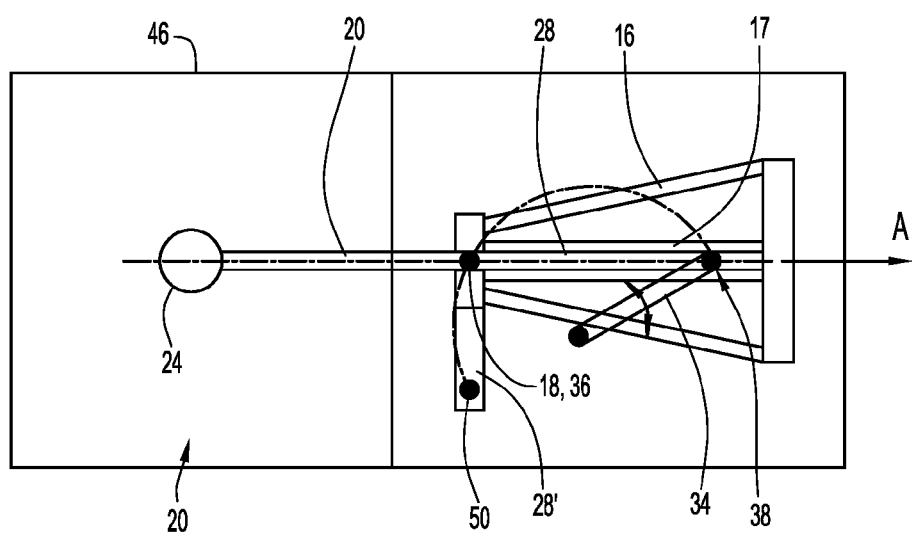
FIG. 3 is a plan view of the load cell of FIG. 2.

It is possible, in both embodiments, to provide a further adjusting weight boom arm 28' as shown in FIG. 3. The adjusting weight boom arm 28' extends transversely to the longitudinal direction A, preferably at right angles away from the adjusting weight boom arm 28, particularly starting from the force application point 18, where the adjusting weight boom arm is linked to the weighing system 14. The adjusting weight boom arm 28' merges into both of the other boom arms 20, 28 or is fastened thereto. The adjusting weight boom arm 28' is used to determine and possible compensate for the left/right off-center load error.

In order to reduce the expense for the activating unit 34 and, above all, to provide only one activating unit 34, the adjusting weight engagement point 50 at the adjusting weight boom arm 28' can be arranged on a circular path (see the interrupted line in FIG. 3), which also passes through the adjusting weight engagement points 36, 38. The activating unit 34 can therefore pivot along a path for the horizontal movement of the adjusting weight 30.

The above description of various embodiments has been given by way of example. From the disclosure given, those skilled in the art will not only understand the present invention and its attendant advantages, but will also find apparent various changes and modifications to the structures and methods disclosed. The applicant seeks to cover all such changes and modifications as fall within the scope of the invention, as originally disclosed and defined by the appended claims.

The invention claimed is:

1. A load cell comprising:
    a weighing system having a force application point,
    a load boom arm for receiving loads to be weighed at a position remote from the force application point, wherein the load boom arm extends, in a plan view of the load cell, from the force application point in a longitudinal direction (A),
    an adjusting weight boom arm which extends in the longitudinal direction (A) on a side opposing the load boom arm relative to the force application point and which has at least two pre-determined adjusting weight engagement points provided thereon,
    a further adjusting weight boom arm for placement of the adjusting weight, extending transversely to the longitudinal direction (A), and
    at least one activating unit which places at least one adjusting weight onto the adjusting weight engagement points.

2. The load cell as claimed in claim 1, further comprising a housing from which the load boom arm extends, wherein the adjusting weight boom arm is accommodated in the housing.

3. The load cell as claimed in claim 2, wherein the load boom arm and the adjusting weight boom arm extend within the housing at the same height and/or vertically offset.

4. The load cell as claimed in claim 1, wherein a single adjusting weight can be placed selectively onto any of the adjusting weight engagement points of the adjusting weight boom arm.

5. The load cell as claimed in claim 1, wherein an adjusting weight engagement point is essentially moment-free in relation to the weighing system and the other adjusting weight engagement point is remote from the force application point or wherein both adjusting weight engagement points are located at different distances from the force application point.

6. The load cell as claimed in claim 1, wherein the two adjusting weights have mutually essentially identical mass.

7. The load cell as claimed in claim 1, wherein at least one of: (i) the load boom arm and the adjusting weight boom arm are linked to a single site in the weighing system or (ii) the adjusting weight boom arm is a linear extension of the load boom arm extending beyond the force application point.

8. The load cell as claimed in claim 7, wherein the load boom arm and the adjusting weight boom arm are linked to the single site in the weighing system and merge into one another.

9. The load cell as claimed in claim 1, wherein a plurality of dedicated adjusting weights are provided for each of the adjusting weight engagement points, and wherein the activating unit places the adjusting weights one after the other onto the adjusting weight boom arm.

10. A method for adjusting a load cell as claimed in claim 1 and comprising:
  placing at least one adjusting weight on two adjusting weight engagement points provided at the adjusting weight boom arm,
  determining the weight values of the at least one adjusting weight at both the adjusting weight engagement points,
  calculating the change in the off-center load between a factory adjustment and the weight values determined as an off-center load error, and
  determining a calibration factor of the load cell taking account of the off-center load error or a change in the off-center load error.

11. The method as claimed in claim 10, further comprising calculating a change in the off-center load from the deviation of the difference of the two determined weight values from the calibration factor.

12. The method as claimed in claim 10, further comprising, during manufacturing, storing a limit value for a maximum off-center load in the load cell, and during operation and on reaching or exceeding the limit value of the stored off-center load, outputting an error message.

* * * * *